(12) United States Patent
Trepte

(10) Patent No.: US 10,764,585 B2
(45) Date of Patent: *Sep. 1, 2020

(54) REPROJECTING HOLOGRAPHIC VIDEO TO ENHANCE STREAMING BANDWIDTH/QUALITY

(71) Applicant: Microsoft Technology Licensing, LLC, Redmond, WA (US)

(72) Inventor: Forrest Power Trepte, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,740

(22) Filed: Jan. 9, 2019

(65) Prior Publication Data

US 2019/0208210 A1 Jul. 4, 2019

Related U.S. Application Data

(63) Continuation of application No. 15/403,649, filed on Jan. 11, 2017, now Pat. No. 10,212,428.

(51) Int. Cl.
| | |
|---|---|
| *H04N 19/137* | (2014.01) |
| *G06T 7/254* | (2017.01) |
| *H04N 19/597* | (2014.01) |
| *H04N 19/503* | (2014.01) |
| *H04N 19/46* | (2014.01) |
| *G06T 9/00* | (2006.01) |
| *G06T 7/70* | (2017.01) |
| *G06T 15/04* | (2011.01) |

(Continued)

(52) U.S. Cl.
CPC .......... *H04N 19/137* (2014.11); *G06T 7/254* (2017.01); *G06T 7/70* (2017.01); *G06T 9/00* (2013.01); *G06T 9/001* (2013.01); *G06T 15/04* (2013.01); *G06T 15/405* (2013.01); *G06T 19/006* (2013.01); *H04N 19/46* (2014.11); *H04N 19/503* (2014.11); *H04N 19/597* (2014.11); *G06T 2207/10016* (2013.01); *G06T 2207/10028* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 8,964,830 B2 * | 2/2015 | Perlman | A63F 13/86 375/240.01 |
| 2007/0171235 A1 * | 7/2007 | Fujita | H04N 5/20 345/619 |

(Continued)

*Primary Examiner* — Hilina K Demeter
(74) *Attorney, Agent, or Firm* — Workman Nydegger

(57) ABSTRACT

Improved video compression and video streaming systems and methods are disclosed for environments where camera motion is common, such as cameras incorporated into head-mounted displays. This is accomplished by combining a 3D representation of the shape of the user's environment (walls, floor, ceiling, furniture, etc.), image data, and data representative of changes in the location and orientation (pose) of the camera between successive image frames, thereby reducing data bandwidth needed to send streaming video in the presence of camera motion.

20 Claims, 8 Drawing Sheets

(51) Int. Cl.
*G06T 15/40* (2011.01)
*G06T 19/00* (2011.01)

(56) References Cited

U.S. PATENT DOCUMENTS

| | | | | |
|---|---|---|---|---|
| 2007/0297645 A1* | 12/2007 | Pace | ............... | G06K 9/00711 |
| | | | | 382/103 |
| 2012/0183075 A1* | 7/2012 | Karkkainen | ......... | H04N 19/176 |
| | | | | 375/240.24 |

* cited by examiner

REPROJECTING HOLOGRAPHIC VIDEO TO ENHANCE STREAMING BANDWIDTH/QUALITY

CROSS-REFERENCE TO RELATED APPLICATIONS

This application is a continuation of U.S. patent application Ser. No. 15/403,649 filed on Jan. 11, 2017, entitled "REPROJECTING HOLOGRAPHIC VIDEO TO ENHANCE STREAMING BANDWIDTH/QUALITY," which application is expressly incorporated herein by reference in its entirety.

BACKGROUND

Background and Relevant Art

Mixed reality is a technology that allows virtual imagery to be mixed with a real world physical environment in a display. Systems for mixed reality may include, for example, see through head-mounted display (HMD) devices or smart phones with built in cameras. Such systems typically include processing units which provide the imagery under the control of one or more applications. Full virtual reality environments, in which no real world objects are viewable, can also be supported using HMD and other devices.

Many HMDs also include one or more forward-facing cameras that capture the environment in front of the user as viewed from the user's perspective. Such forward-facing cameras may be depth cameras, which not only capture image data, but also capture depth or surface data about the user's environment. Image data captured from the forward-facing camera may be used by on-board processors located on the HMD to generate mixed reality or virtual reality display data that can be rendered to the user via the user display incorporated into the HMD. In addition, image data captured from the forward-facing camera can be compressed, via video compression algorithms, and transmitted to other devices for viewing by others at other locations. For example, in a training situation, video from the forward-facing camera(s) of a HMD can be transmitted to a trainer at a remote location so that the trainer can observe in almost real time what the trainee is doing, allowing the trainer to guide or instruct, via audio and/or video communications, the trainee on how to perform a specific task (all the while observing what the trainee is actually doing). Video quality is important to making this scenario work, but video quality is limited by the user's wife connection and Internet bandwidth. Technologically, Internet bandwidth is growing at a slower rate than the resolution of cameras and displays, so data compression can be very important to video streaming.

HMDs present some unique challenges in relation to video compression and streaming live video. As mentioned in the preceding paragraph, bandwidth limitations can be one challenge. In addition, many existing video compression techniques, such as P-frame and B-frame techniques, rely on the notion that much of the background of successive frames of video remain relatively static from one video frame to the next, so that only data relating to those pixels that actually change between one video frame and the next need to be transmitted. However, in the context of a HMD, head movement can result in much more frequent and greater changes in the image data, including the background, which reduces the effectiveness of known video compression techniques. Typical streaming video compression strategies are not tuned to accommodate a large amount of camera movement.

Thus, in situations where camera movement (i.e., changes in camera location and/or orientation) occurs frequently, such as in the context of HMDs, improved systems, devices and methods are needed for video compression and video streaming to reduce bandwidth requirements and/or improve resolution.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Improved video compression and video streaming systems and methods are disclosed for environments where camera motion is common, such as cameras incorporated into handheld devices, such as mobile phones, tablets, laptops, etc., or HMDs. This is accomplished by combining a 3D representation of the shape of the user's environment (walls, floor, ceiling, furniture, etc.), image data, and data representative of changes in the location and orientation (pose) of the camera between successive image frames. The benefit of this is that it reduces data bandwidth needed to send streaming video in the presence of camera motion.

This technology applies to a holographic device with a video camera, depth sensor, and the ability to determine its position in 3D space. A streaming application running on the device can execute an image-warping 3D transformation applied to previous frames before passing them to a video compressor that computes P-frames (or B-frames). This makes use of the known 3D position of the camera and 3D geometry in front of the camera to reproject the previous frame based on the current location of the camera.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
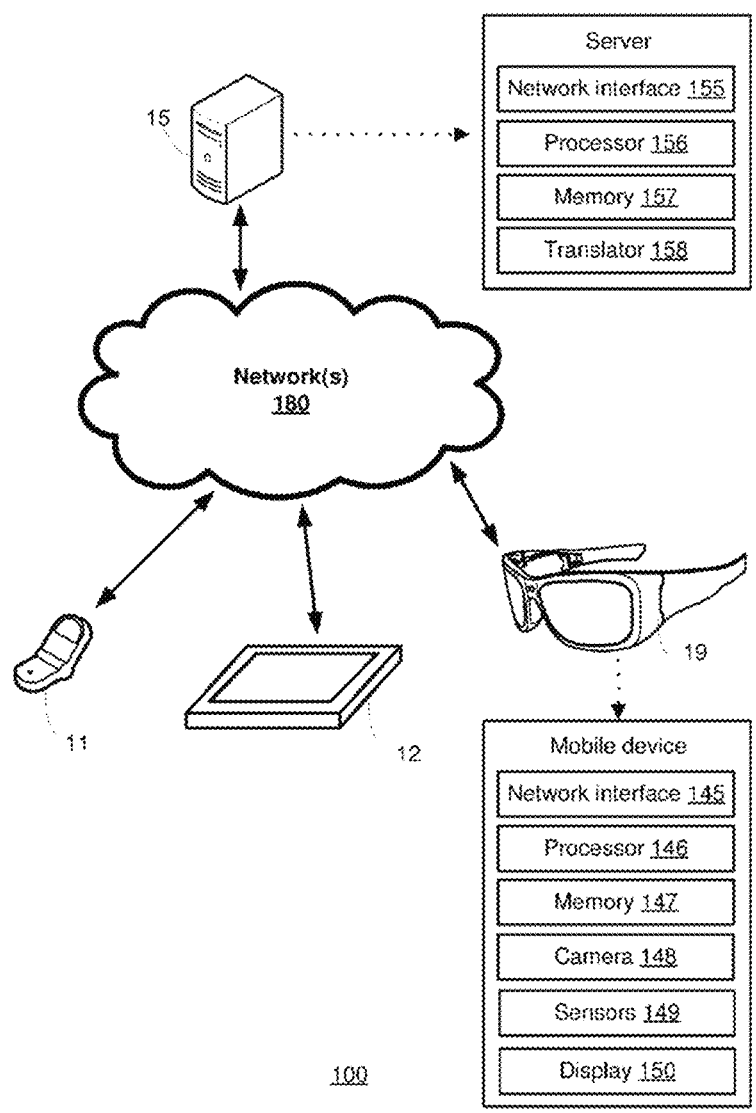
FIG. 1 is a functional block diagram of one illustrative example of an operating environment for implementing the systems and methods disclosed herein.

The following discussion now refers to a number of systems, methods and method acts that may be performed. Although various method acts may be discussed in a certain order or illustrated in a flow chart as occurring in a particular order, no particular ordering is required unless specifically stated, or required because an act is dependent on another act being completed prior to the act being performed.

Technology is disclosed herein for providing improved video compression and video streaming systems and methods that are particularly suited for environments where camera motion is common, such as cameras incorporated into handheld devices, such as mobile phones, tablets, laptops, etc., or HMDs. This is accomplished by combining a 3D representation of the shape of the user's environment (walls, floor, ceiling, furniture, etc.), image data, and data representative of changes in the location and orientation (pose) of the camera between successive image frames. The benefit of this is that it reduces data bandwidth needed to send streaming video in the presence of camera motion.

One embodiment disclosed herein includes video compression systems and methods that can include: capturing successive frames of video from a camera incorporated into a first device, the successive frames of video comprising a previous frame image and a current frame image and including surface (depth) information; constructing a first 3D representation of the shape of a user's environment based on the surface (depth) information of the previous frame image and a first camera location and orientation (pose) corresponding to the previous frame image; projecting the previous frame image onto the first 3D representation; detecting a change in the location and orientation (pose) of the camera between the previous frame image and the current frame image and generating current frame camera pose data representative of the location and orientation (pose) of the camera for the current frame image; constructing a second 3D representation of the shape of the user's environment based on a second camera location and orientation (pose) corresponding to the current frame image, the second 3D representation corresponding to the shape of the user's environment as if it were viewed from the second location and orientation (pose) of the camera, and rendering the second 3D representation to generate a re-projected previous frame image as viewed from the second location and orientation (pose) of the camera; passing the re-projected previous frame image to a video compressor for computing differences between the re-projected previous frame image and the actual current frame image; and generating compressed video data comprising only the differences between the re-projected previous frame image and the actual current frame image.

Another embodiment includes video streaming systems and methods that can decode compressed video data by: receiving at a second device, compressed video data and current frame camera pose data; constructing, by the second device, a 3D representation of the shape of the user's environment based on the received current frame camera pose data and rendering the 3D representation to generate a re-projected previous frame image data; applying the received compressed video data to the re-projected previous frame image data to generate current frame image data.

In yet another embodiment, the compressed video data can be generated by a first device, in the manner described herein, and then compressed video data communicated to a second device for decompression in the manner described herein.

These systems and methods will be described below in the context of head mounted augmented or mixed reality (AR) display, such as the Microsoft HoloLens. It should be understood, however, that the systems and methods described and claimed here in are not limited to HMDs, the HoloLens or any other specific device, but may be adapted to any device that is capable of capturing images, generating 3D representations of the shape of the user's environment (walls, floor, ceiling, furniture, etc.), and tracking the location and orientation (pose) of the device.

Exemplary Operating Environment

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, memory 157, and translator 158, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein. Translator 158 may include mapping logic for translating a first file of a first file format into a corresponding second file of a second file format (i.e., the second file may be a translated version of the first file). Translator 158 may be configured using file mapping instructions that provide instructions for mapping files of a first file format (or portions thereof) into corresponding files of a second file format.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images of an environment. The mobile device 19 may include outward facing cameras that capture images of the environment and inward facing cameras that capture images of the end user of the mobile device. Sensors 149 may generate motion and/or orientation information associated with mobile device 19. In some cases, sensors 149 may comprise an inertial measurement unit (IMU). Display 150 may display digital images and/or videos. Display 150 may comprise a see-through display. Display 150 may comprise an LED or OLED display.

In some embodiments, various components of mobile device 19 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 19 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, mobile device 19 comprises a HMD that provides an augmented reality environment or a mixed reality environment to an end user of the HMD. The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing an HMD, an end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment may be performed by server 15 (i.e., on the server side) while camera localization may be performed on mobile device 19 (i.e., on the client side). The virtual objects may include a text description associated with a real-world object.

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the mobile device 19 may specify a particular file format for receiving the one or more virtual objects and server 15 may transmit to the mobile device 19 the one or more virtual objects embodied within a file of the particular file format.

In some embodiments, an HMD, such as mobile device 19, may use images of an environment captured from an outward facing camera in order to determine a six degree of freedom (6DOF) pose corresponding with the images relative to a 3D model of the environment. The 6DOF pose may comprise information associated with the position and orientation of the HMD within the environment. The 6DOF pose may be used for localizing the HMD and for generating images of virtual objects such that the virtual objects appear to exist at appropriate locations within the environment. More information regarding determining a 6DOF pose can be found in U.S. patent application Ser. No. 13/152,220, "Distributed Asynchronous Localization and Mapping for Augmented Reality," incorporated herein by reference in its entirety. More information regarding performing pose estimation and/or localization for a mobile device can be found in U.S. patent application Ser. No. 13/017,474, "Mobile Camera Localization Using Depth Maps," incorporated herein by reference in its entirety.

In some embodiments, an HMD, such as mobile device 19, may display images of virtual objects within an augmented reality (AR) environment at a frame rate that is greater than a rendering frame rate for the core rendering pipeline or rendering graphics processing unit (GPU). The HMD may modify pre-rendered images or forward predicted images that are rendered at the rendering frame rate based on updated pose estimates that are provided at a higher frequency than the rendering frame rate. In some embodiments, the HMD may generate the pre-rendered image based on a predicted pose at the rendering frame rate (e.g., every 16 ms), determine one or more updated poses associated with the HMD subsequent to generating the pre-rendered image (e.g., every 2 ms), generate one or more updated images based on the one or more updated poses and the pre-rendered image, and display the one or more updated images on the HMD. In some cases, the one or more updated images may be generated via homographic transformations and/or a pixel offset adjustments using circuitry within the display, such as display 150.

Figure 2:
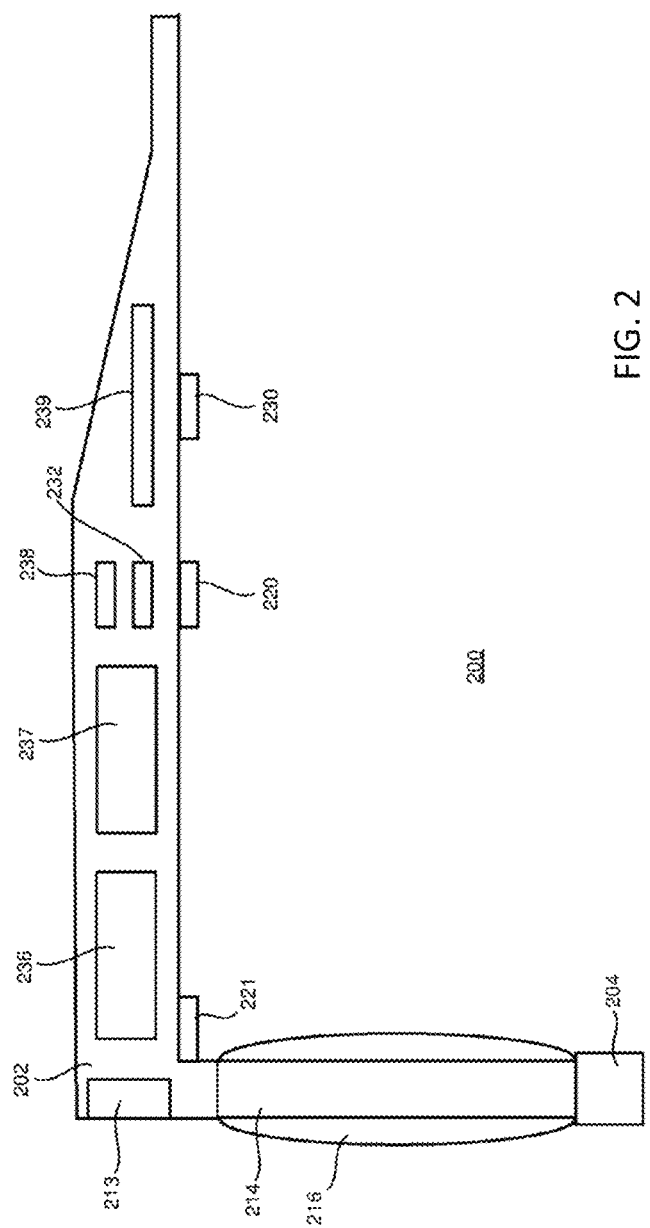
FIG. 2 is a schematic representation of one illustrative example of an HMD.

FIG. 2 depicts one embodiment of a portion of an HMD 200, such as mobile device 19 in FIG. 1. Only the right side of HMD 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The capture device 213 may also include one or more microphones for recording sounds and may transmit the audio recordings to processing unit 236.

Right temple 202 also includes biometric sensor 220, eye tracking system 221, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include one or more inward facing cameras. In another embodiment, the eye tracking system 221 may comprise an eye tracking illumination source and an associated eye tracking image sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011, both of which are herein incorporated by reference.

In one embodiment, eye glass 216 may comprise a see-through display, whereby images generated by processing unit 236 may be projected and/or displayed on the see-through display. The see-through display may display images of virtual objects by modulating light provided to the display, such as a liquid crystal on silicon (LCOS) display, or by generating light within the display, such as an OLED display. The capture device 213 may be calibrated such that a field of view (FOV) captured by the capture device 213 corresponds with the FOV as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the FOV captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Gaze detection may be used to identify where the end user is focusing within a FOV. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

Microsoft HoloLens

One example of a HMD is the Microsoft HoloLens, which is a pair of mixed reality head-mounted smartglasses. HoloLens has see-through holographic lenses that use an advanced optical projection system to generate multi-dimensional full-color holograms with very low latency so a user can see holographic objects in a real world setting.

Located at the front of the HoloLens are sensors and related hardware, including cameras and processors. The HoloLens also incorporates an inertial measurement unit (IMU), which includes an accelerometer, gyroscope, and a magnetometer, four "environment understanding" sensors, an energy-efficient depth camera with a 120°×120° angle of view, a forward-facing 2.4-megapixel photographic video camera, a four-microphone array, and an ambient light sensor. HoloLens contains advanced sensors to capture information about what the user is doing and the environment the user is in. The built in cameras also enable a user to record (mixed reality capture (MRC)) HD pictures and video of the holograms in the surrounding world to share with others.

Enclosed within the visor is a pair of transparent combiner lenses, in which the projected images are displayed in the lower half. The HoloLens must be calibrated to the inter-pupillary distance (IPD), or accustomed vision of the user.

Along the bottom edges of the side, located near the user's ears, are a pair of small, 3D audio speakers. The speakers do not obstruct external sounds, allowing the user to hear virtual sounds, along with the environment. Using head-related transfer functions, the HoloLens generates binaural audio, which can simulate spatial effects; meaning the user, virtually, can perceive and locate a sound, as though it is coming from a virtual pinpoint or location.

On the top edge are two pairs of buttons: display brightness buttons above the left ear, and volume buttons above the right ear. Adjacent buttons are shaped differently—one concave, one convex—so that the user can distinguish them by touch.

At the end of the left arm is a power button and row of five, small individual LED nodes, used to indicate system status, as well as for power management, indicating battery level and setting power/standby mode. A USB 2.0 micro-B receptacle is located along the bottom edge. A 3.5 mm audio jack is located along the bottom edge of the right arm.

In addition to a central processing unit (CPU) and GPU, HoloLens features a custom-made Microsoft Holographic Processing Unit (HPU), a coprocessor manufactured specifically for the HoloLens. The main purpose of the HPU is processing and integrating data from the sensors, as well as handling tasks such as spatial mapping, gesture recognition, and voice and speech recognition. The HPU processes terabytes of information from the HoloLens's sensors from real-time data.

The lenses of the HoloLens use optical waveguides to color blue, green, and red across three different layers, each with diffractive features. A light engine above each combiner lens projects light into the lens, a wavelength which then hits a diffractive element and is reflected repeatedly along a waveguide until it is output to the eye. Similar to that of many other optical head-mounted displays, the display projection for the HoloLens occupies a limited portion of the user's FOV, particularly in comparison to virtual reality head-mounted displays, which typically cover a much greater FOV.

The HoloLens contains an internal rechargeable battery, but can be operated while charging. HoloLens also features IEEE 802.11ac Wi-Fi and Bluetooth 4.1 Low Energy (LE) wireless connectivity.

With HoloLens a user can create and shape holograms with gestures, communicate with apps using voice commands, and navigate with a glance, hand gestures, Controllers and/or other pointing devices. HoloLens understands gestures, gaze, and voice, enabling the user to interact in the most natural way possible. With spatial sound, HoloLens synthesizes sound so the user can hear holograms from anywhere in the room, even if they are behind the user.

Additional details about the HoloLens are provided in U.S. Patent Application Ser. No. 62/029,351, filed Jul. 25, 2014, and entitled "Head Mounted Display Apparatus," which is incorporated herein by reference.

As mentioned above, the HoloLens includes a depth camera, which is capable of detecting the 3D location of objects located within the depth camera's FOV. Technical details of exactly how the depth camera accomplishes such detection are known to those skilled in the art, but are not necessary for the present disclosure. Suffice it to say that the depth camera is able to accurately detect, on a pixel-by-pixel basis, the exact 3D location of each point on a physical object within the camera's FOV. While the HoloLens uses a depth camera, stereoscopic optics can also be used to detect the distance of objects from the HMD and the locations of such objects in 3D space via triangulation. In either event, such sensors can detect the 3D location (x, y and z coordinates) of real objects located within the FOV relative to the HMD. In the case of a Controller, the depth camera of the HMD can be used to detect the 3D location of the Controller relative to the HMD.

Figure 3:
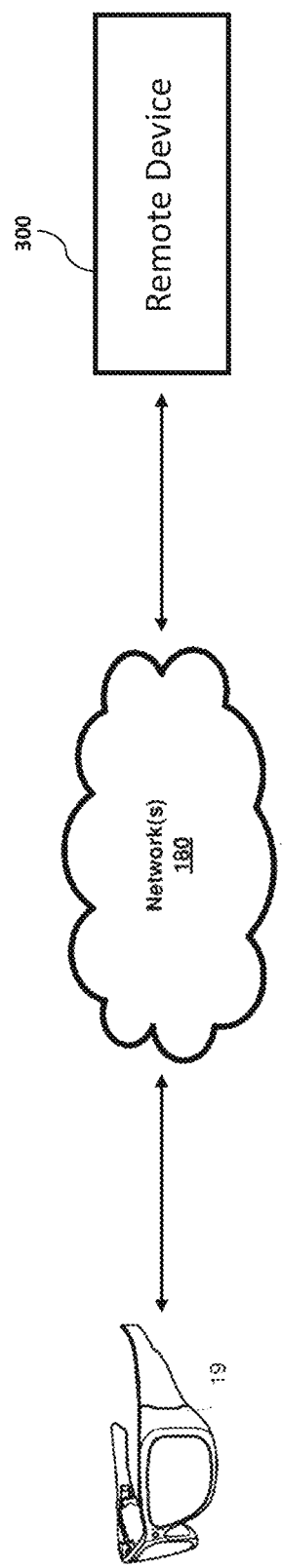
FIG. 3 is a general block diagram of one illustrative example of a teleconferencing system.

Referring to FIG. 3, in another embodiment, the augmented reality features of an HMD can be combined with commercially available videoconferencing services, such as Skype, to provide a unique communications experience ("HoloSkype") that is particularly suited for training and other interactive activities between two or more user's at different locations. Utilizing the forward facing depth cameras integrated into an HMD, a person located at a remote location can observe the environment of an HMD user and provide real time feedback, instructions and directions to the HMD user for performing tasks on objects that are located within the HMD user's field of vision. For example, as schematically illustrated in FIG. 3, HMD 19 may communicate audio and video data via one or more network(s) 180 to another person operating a computing device at another, remote location ("remote device 300"). Remote device 300 can be a conventional desktop computer, laptop, tablet, smart phone, or any other computing device that is capable of receiving and rendering audio and/or video data via network(s) 180. In addition, by using a camera, microphone and other input devices incorporated in remote device 300, audio and/or video of the person located at the remote location can be transmitted from remote device 300 via network(s) 180 back to HMD 19 for rendering and display to the HMD user in substantially real time (which can be layered over a portion of the real world environment within the HMD user's FOV). In addition, via the HoloSkype interface, the remote device 300 can transmit instructions to HMD 19 that cause HMD 19 to render holographic images, such as written instructions and/or drawings, within the HMD user's FOV.

In order to stream video between HMD 19 and remote device 300, various data compression methods are commonly used to reduce data bandwidth and/or increase resolution. However, as previously discussed, conventional data compressions systems and methods tend to be less efficient in environments in which camera movement is common, as is frequently the case with HMDs.

Video is commonly compressed using P-frames (or B-frames). This reduces the amount of data that needs to be sent because only differences from a previous frame need to be sent. Areas of the image that are not moving do not require any additional data to be sent. Conventional P-frame or B-frame video compression works best if the camera is stationary. When the camera is moving, every pixel of the image can appear to change from one frame to the next. In order to handle motion, additional information is needed about how pixels are moving. For example, the camera is moving to the right, one way to process the image could be to shift everything right by a certain number of pixels and then compute the differences based on the shifted image. Of course, it is not that simple because pixels will move differently because objects are at different depths. A HoloLens user may rotate their head, move forward (zooming pixels outward), or sideways (moving pixels by a different parallax amount at different depths).

Figure 4:
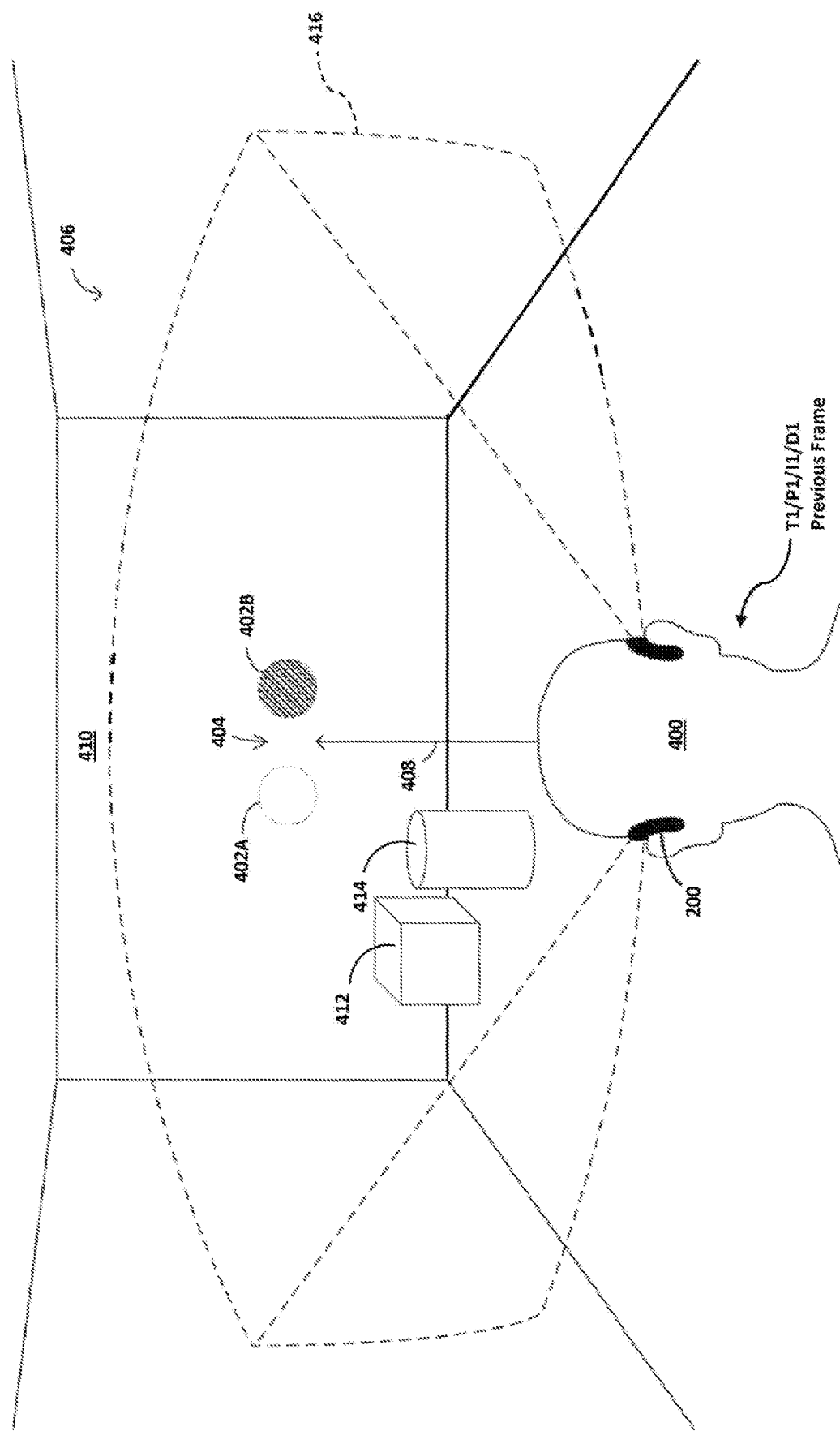
FIG. 4 is a schematic representation of a first FOV of a 3D environment when viewed from a first location through an HMD.

FIG. 4 illustrates an augmented reality configuration of a HMD device 200 worn by a user 400, displaying a virtual cursor, which is a holographic cursor 402 in this example, on an at least partially see-through stereoscopic display of HMD 200 so as to appear to at a location 404 in a three dimensional environment 406. In the specific example shown in FIG. 4, the three dimensional environment 406 is a room in the real world, and the holographic cursor 402 is displayed on the at least partially see-through stereoscopic display such that the holographic cursor 402 appears to the user 400, to be hovering in the middle of the room at the location 404.

Additionally, in the example illustrated in FIG. 4, the forward facing depth cameras of the HMD 200 worn by the user 400 captures image data of the three dimensional environment 406, which may include the physical layout of the room, actual tangible objects located in the room, such as objects 412 and 414, and their respective locations relative to one another and relative to HMD 200. As mentioned previously, HMD 200 creates a detailed 3D textured model of three dimensional environment 406, which is continuously updated over time. In addition, for each frame of video captured by the depth cameras, each pixel of image data is mapped to its corresponding location on the 3D model. This mapping of image pixels to the 3D textured model or mesh also makes it possible to perform homographic transformations to reproject an image so that it appears as if it were viewed by the user 400 from a different relative location. The graphics processing unit (GPU) can execute such mappings and transformations with high performance.

For example, FIG. 4 schematically illustrates user 400 and time T1 and at position P1. At that time, a first frame of image data (I1) and depth data (D1) is captured by the forward facing depth cameras of HMD 200. For purposes of this discussion, the image data associated with I1 may be referred to as simply I1, image data 1 or the previous frame image. As discussed elsewhere, HMD 200 can create a 3D textured model or mesh of the environment within the user's FOV using the depth data D1. In addition, HMD 200 maps the image data I1 to the 3D model or mesh (D1). By virtue of the mapping of the image data I1 to the 3D model or mesh D1, it is possible to reproject, re-draw or re-render I1 from a different viewing location to create a reprojected previous frame image.

Such reprojection can be accomplished via known methods of image transformation or reprojection techniques of varying computational complexity. For example, image reprojection techniques may include texturing the mesh and rendering it from a new camera position, per pixel reprojection (e.g., where each pixel of a rendered image is reprojected based on an updated pose), multi-plane homography (e.g., where multiple rendered images associated with multiple planes within a 3D scene are used to generate the composite updated image), single plane homography (e.g., where a single rendered image associated with a single plane within a 3D scene is used to generate the updated image), affine homography, and pixel offset based adjustments. The 2D plane (or a set of one or more 2D planes) within a 3D scene may be determined based on which virtual objects the end user of an HMD has been focusing on within a particular period of time. In one example, eye tracking may be used to determine the most frequently viewed virtual objects within the particular period of time (e.g., within the previous 50 ms or 500 ms). In the case of a single plane, the single plane may be selected based on a depth of the most frequently viewed virtual object within the particular period of time (i.e., the single plane may be set based on the location of the most frequently viewed virtual object within the augmented reality environment). In the case of multiple planes, virtual objects within an augmented reality environment may be segmented into a plurality of groups based on proximity to the multiple planes; for example, a first virtual object may be mapped to a near plane if the near plane is the closest plane to the first virtual object and a second virtual object may be mapped to a far plane if the far plane is the closest plane to the second virtual object. A first rendered image may then be generated including the first virtual object based on the near plane and a second rendered image may be generated including the second virtual object based on the far plane. Also, different graphical adjustments may be performed on different portions of a pre-rendered image in order to incorporate higher frequency pose estimates. In one example, a first homographic transformation associated with a first pose of an HMD at a first point in time may be applied to a first portion of the pre-rendered image (e.g., a top portion of the pre-rendered image) and a second homographic transformation associated with a second pose of the HMD at a second point in time subsequent to the first point in time may be applied to a second portion of the pre-rendered image different from the first portion (e.g., a bottom portion of the pre-rendered image). In the case of a scanning display or a progressive scanning display, the first homographic transformation may be applied to pixels associated with a first set of scan lines and the second homographic transformation may be applied to pixels associated with a second set of scan lines different from the first set of scan lines. In one embodiment, the first homographic transformation may be applied to a single first scan line and the second homographic transformation may be applied to a single second scan line (i.e., homographic transformations may be applied on a per scan line basis). Another alternative could be to render 3D surface geometry into a Z-buffer with the same projection as the image camera. Then, reprojection could be applied as a screenspace operation. Each pixel of the image has color (from the camera) and depth (from the z-buffer). This is used to warp the image to a new perspective based on the 3D position of each pixel. In any event, any suitable method or means of performing such a transformation can be used with the systems and methods disclosed herein.

Figure 5:
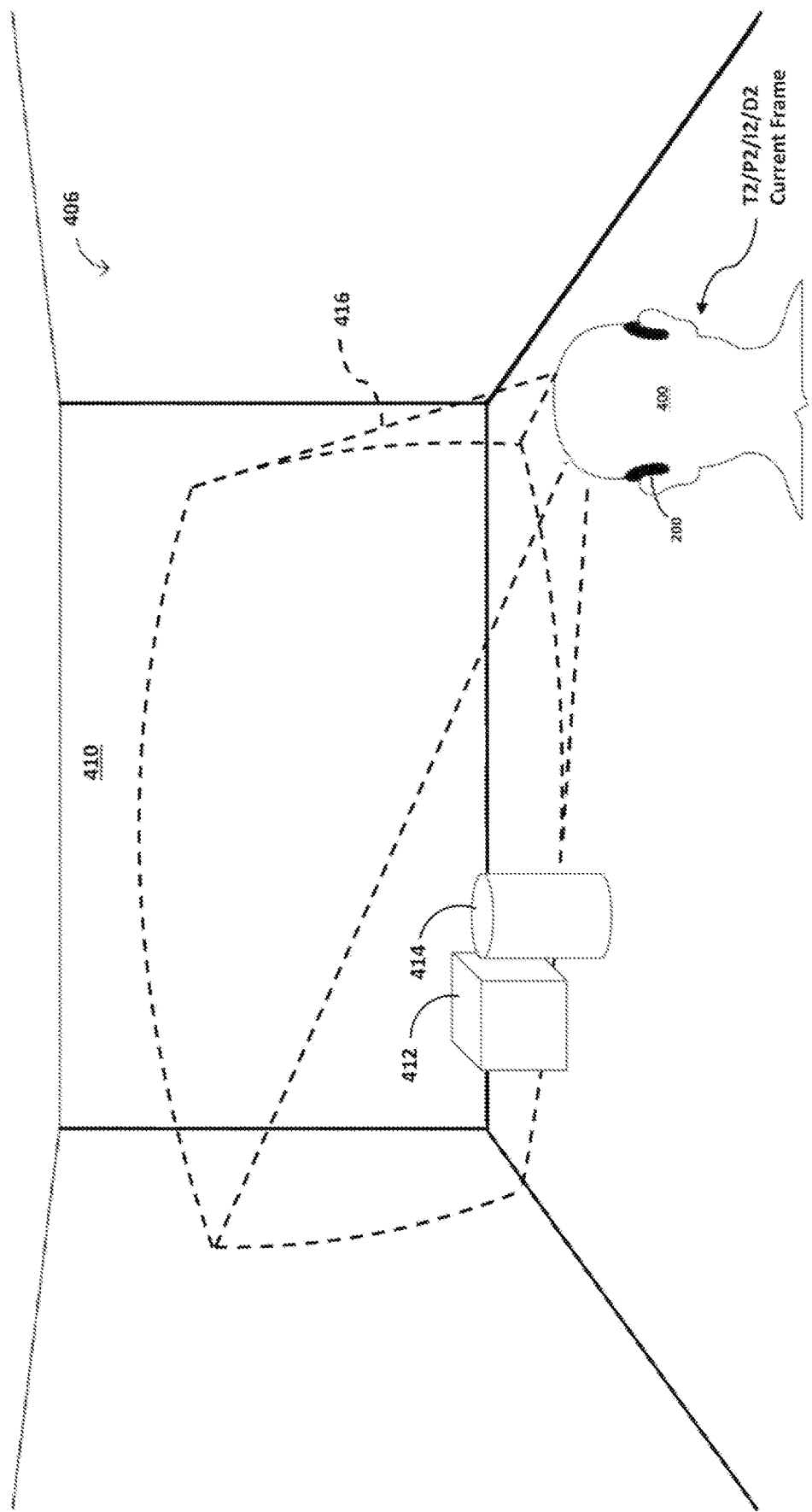
FIG. 5 is a schematic representation of a second FOV of the 3D environment when viewed from a second location through the HMD.

Similarly, FIG. 5 schematically illustrates user 400 at a subsequent point in time, T2, and at a different position, P2, relative to the 3D environment 406. For example, T1 and T2 may be associated with two successive image frames, I1 (the previous frame image) and I2 (the current frame image). If a conventional frame rate of 16 ms is selected, then T1 and T2 could be separated by 16 ms. At time T2, a second frame of image data (I2) and depth data (D2) is captured by the forward facing depth cameras of HMD 200. For purposes of this discussion, the image data associated with I2 may be referred to as simply I2, image data 2 or the current frame image. As discussed elsewhere, HMD 200 can create a 3D textured model of the environment within the user's FOV using the depth data D2. In addition, HMD 200 maps the image data I2 to the 3D model (D2).

Comparing FIGS. 4 and 5 graphically illustrates one of the problems with using conventional video compression in situations where camera movement is common. In such cases, large portions of the background do not remain static (between the previous frame image and the current frame image) due to the change in the location and/or orientation of the camera. Therefore, conventional P-frame processing is less efficient and may not significantly reduce the size of the data set needed to render the next frame image.

Improved Video Compression Methods and Systems

HoloSkype currently sends the following in two independent streams: (1) surface data, which provides a 3D representation of the shape of the user's environment (walls, floor, ceiling, furniture, etc); and (2) video data from the camera on the front of the HoloLens. As described below, the surface data can be combined with the video data, resulting in a lower bandwidth or higher-quality streaming video.

Before compression: (1) project previous frame image onto 3D geometry at previous frame position of camera; (2) detect a change in the pose (position and orientation) of the camera between the previous frame and the current frame; (3) construct 3D geometry using the current frame pose of the camera to produce a reprojected the image of the previous frame as if it were viewed from the location of the camera in the current frame; (5) pass the reprojected previous frame image to the compressor for computing differences between it and the current frame image. This will eliminate differences due to camera movement. Any differences now present are: contents of the scene that have actually moved. (e.g., a person waved their hand), or small differences that are revealed by the new position of the camera (e.g., the side of an object that was not visible in the previous frame, but is now in view from the pose of the camera of the current frame). These differences should be small relative to the entire frame and, therefore, the amount of data that needs to be transmitted to the receiving device can be significantly less than with prior, conventional video compression methods.

Figure 6:
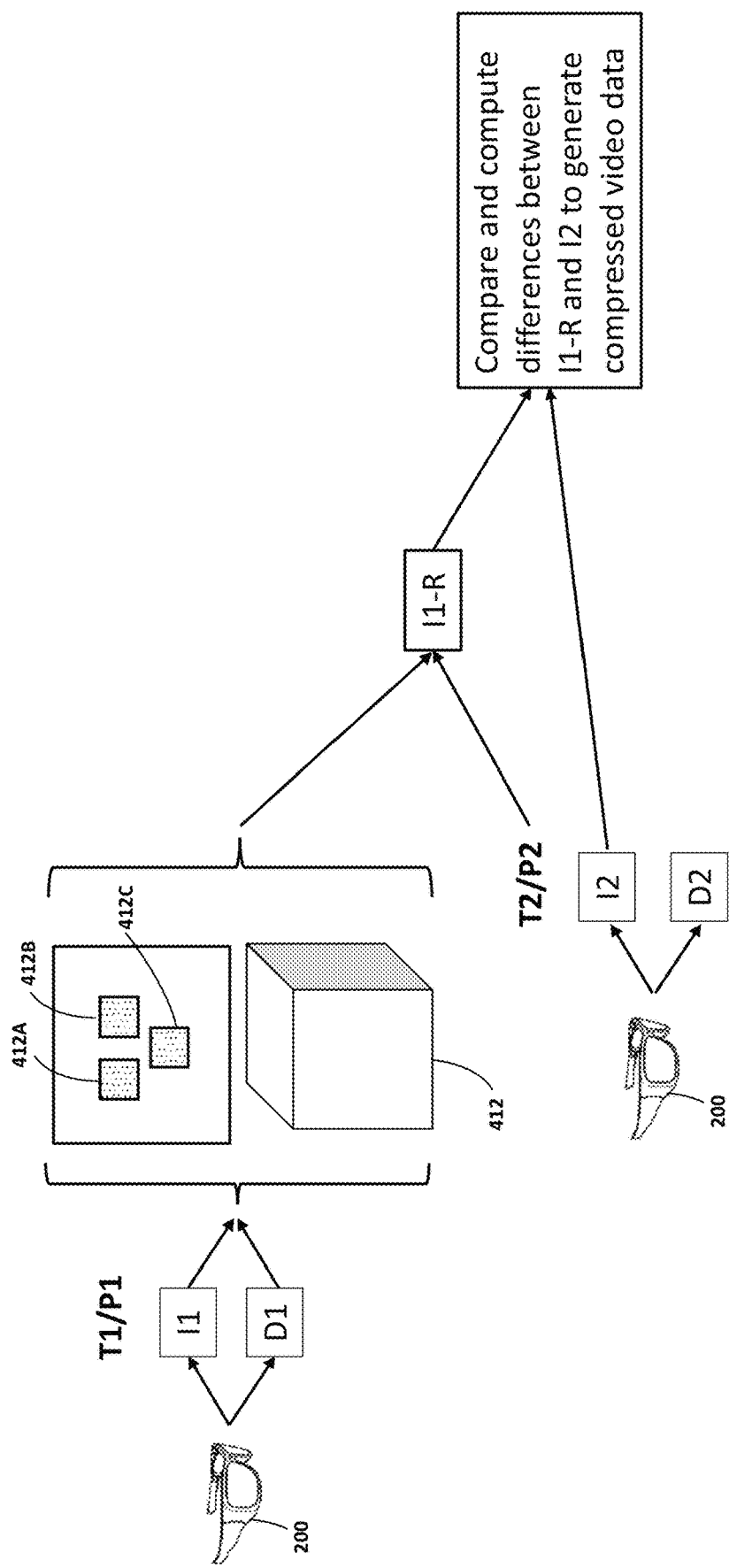
FIG. 6 is functional block diagram illustrating an embodiment of the systems and methods disclosed herein.

This process is schematically illustrated in FIG. 6. Referring first to the upper left-hand portion of FIG. 6, at time T1 and location P1, the forward facing cameras of HMD 200 capture image data I1 and depth data D1, all of which are associated with the previous frame image (I1). As discussed above, the HMD 200 constructs a model of the 3D environment located within the FOV of HMD 200. More specifically, the HMD 200 can construct a surface map of each visible surface of each physical object located within the FOV. For example, in the illustrated example, the textured map could include areas corresponding to physical object 412 (in this case a cube), which could consist of polygons corresponding to the three visible surfaces 412A, 412B, and 412C of object 412. Next the HMD 200 will map the pixels of image data I1 to the appropriate corresponding locations on the textured model (as schematically illustrated by the stippling). As discussed above, this mapping allows the previous frame image I1 to be reprojected, via homographic transformation techniques, to appear as it would when viewed from a different camera pose (location and/or orientation).

If a change in location and/or orientation (pose) of HMD 200 is detected between the previous frame and the current frame, then the HMD 200 uses the textured model and the new location (P2) of the HMD/camera to perform the necessary homographic transformation to reproject I1 to generate reprojected previous frame image I1-R. Then I1-R and I2 are passed to a compression engine to compare the differences between I1-R and I2 and to generate compressed image data.

The compressed image data can then transmitted to a second device along with the updated pose data, P2, for the HMD/camera. Using the previous frame image (which the second device already has) in combination with the updated pose data, P2, the second device perform a similar homographic transformation to generate a reprojection of the previous frame image, I1, to produce reprojected previous frame image I1-R. Then, the second device applies the compressed video data to the reprojected previous frame image I1-R to render the current frame image I2.

In rendering the re-projected previous frame image, the same 3D model should be used by both the first device and the second device. For example, the first device can send a 3D model to the second device, and the two devices agree on the 3D model that will be used to render the re-projected previous frame image. Thus, in one embodiment, the 3D model associated with the previous frame can be communicated between and used by both devices for generating the re-projected previous frame. Similarly, in another embodiment, the 3D model associated with the current frame can be communicated between and used by both devices for generating the re-projected previous frame. In still yet another embodiment, updates to the 3D model (i.e., only differences between a prior 3D model and a subsequent 3D model) could be communicated between and used by the first and second devices. In a situation in which the 3D environment does not change significantly, yet another possibility could be to scan the 3D model, send it at the beginning of each session, and then perform all re-projections relative to that model without sending changes.

The bandwidth savings achieved by using the systems and methods disclosed herein can be best where much of the contents of the 3D environment are static. In such cases, any errors introduced by changes in the 3D model itself will generally be relatively minor. When the 3D model is different between the previous frame and the current frame, this can result in errors (distortion) in the re-projected previous frame image regardless of whether the previous frame model or the current frame model is used. When the 3D environment itself is moving, it can be difficult to understand this 3D motion and use it to re-project in a way that accounts for this motion. However, with the systems and methods disclosed herein these errors are corrected when they are included in the compressed video data that captures differences between the re-projected previous frame and the actual current frame.

In another embodiment, the surface geometry can be continuously updated over time. As the user looks at different areas of the 3D environment, different surfaces may become visible. Over time, the textured model can be updated and refined to include these additional surfaces. All previous frames can be used to refine the textures applied to surfaces as the user looks around the room. If the sender and receiver build matching models, then frame differences can be computed relative to a render of these models based on the current position of the camera. In this way, whenever a new surface comes into view, the most recent view of that object can be used even if it was not visible in the previous frame image.

Figure 7:
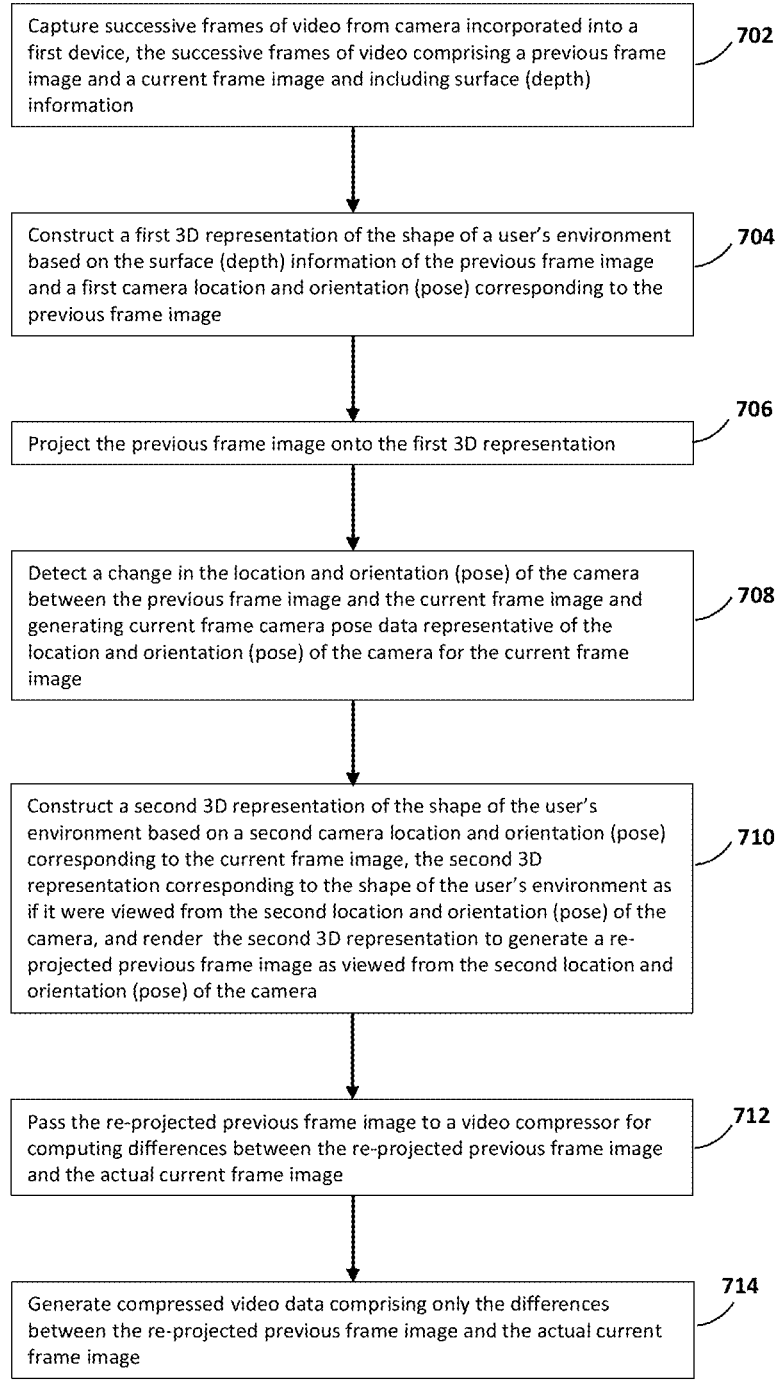
FIG. 7 is functional block diagram illustrating an embodiment of the systems and methods disclosed herein.

One embodiment of the foregoing video compression system and method is more particularly illustrated in FIG. 7. The system can include a computer system having one or more processors and one or more computer-readable media having stored thereon executable instructions that when executed by the one or more processors configure the computer system to perform the various steps of the compression process, as follows. At step 702, the system or method can capture successive frames of video from a camera incorporated into a first device, the successive frames of video comprising a previous frame image and a current frame image and including surface (depth) information. At step 704, the system or method can construct a first 3D representation of the shape of a user's environment based on the surface (depth) information of the previous frame image and a first camera location and orientation (pose) corresponding to the previous frame image. At step 706, the system or method can project the previous frame image onto the first 3D representation. At step 708, the system or method can detect a change in the location and orientation (pose) of the camera between the previous frame image and the current frame image and generate current frame camera pose data representative of the location and orientation (pose) of the camera for the current frame image. At step 710, the system or method can construct a second 3D representation of the shape of the user's environment based on a second camera location and orientation (pose) corresponding to the current frame image, the second 3D representation corresponding to the shape of the user's environment as if it were viewed from the second location and orientation (pose) of the camera, and render the second 3D representation to generate a re-projected previous frame image as viewed from the second location and orientation (pose) of the camera. At step 712, the system or method can pass the re-projected previous frame image to a video compressor for computing differences between the re-projected previous frame image and the actual current frame image. And, at step 714, the system or method can generate compressed video data comprising only the differences between the re-projected previous frame image and the actual current frame image. The compressed video data can then be saved to a file for additional processing. In addition, the compressed video data can be transmitted to a second, receiving device for further processing as illustrated in FIG. 8.

The system and method illustrated in FIG. 7 can also transmit changes in the surface (depth) data based on the current frame camera pose data. In addition, the system and method illustrated in FIG. 7 can be configured to accumulate, for all previous image frames, a textured model of the 3D environment to refine the textures applied to surfaces as a user encounters the 3D environment from different camera positions over time.

In the context of a HoloSkpye or other videoconferencing session, the compressed video data derived in the manner described above can then be transmitted to a second, receiving device, together with the position of the device camera is sent via the position and rotation of the camera, which is a very small amount of data. At the receiving device, decompression performs the same steps before applying differences to the same reprojection of the previous frame, resulting in a matching image on the other side.

Figure 8:
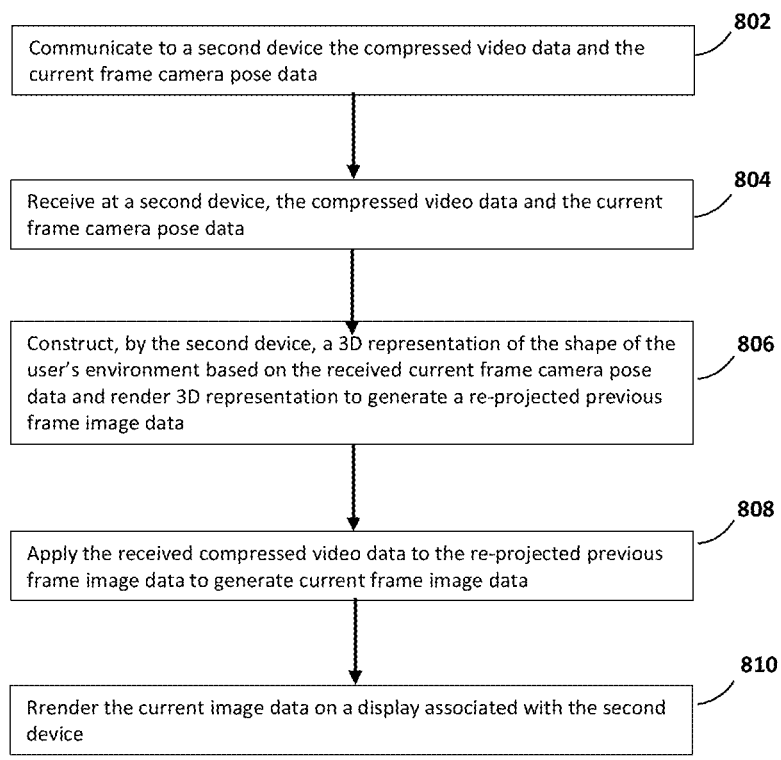
FIG. 8 is functional block diagram illustrating an embodiment of the systems and methods disclosed herein.

More specifically, referring to FIG. 8, the systems and methods can perform the following additional processing. As indicated at step 802, the system or method can communicate to a second device the compressed video data, the current frame camera pose data, and a 3D representation of the shape of the user's environment. At step 804, the system or method can receive at the second device the compressed video data, the current frame camera pose data, and the 3D representation of the shape of the user's environment. At step 806, the system or method can construct, by the second device, a 3D representation of the shape of the user's environment based on the received current frame camera pose data and render the 3D representation to generate a re-projected previous frame image data. At step 808, the system or method can apply the received compressed video data to the re-projected previous frame image data to generate current frame image data. And, at step 810, the system or method can render the current image data on a display associated with the second device.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for compressing video data, comprising:
    one or more processors; and
    one or more computer-readable media having stored executable instructions that are operable, when executed by the one or more processors, to cause the computer system to perform at least the following:
    capture successive frames of video from a camera incorporated into a first device, the successive frames of video comprising one or more first frame image(s) and one or more second frame image(s) and including surface (depth) information;
    detect a change in a location and orientation (pose) of the camera between a first location and orientation (pose) of the one or more first frame image(s) and a second location and orientation (pose) of the one or more second frame image(s);
    generate re-projected one or more first frame image(s) as viewed from the second location and orientation (pose);
    pass the re-projected one or more first frame image(s) to a video compressor for computing differences between the re-projected one or more first frame image(s) and the one or more second frame image(s); and
    generate compressed video data comprising only the differences between the re-projected one or more first frame image(s) and the one or more second frame image(s).

2. The computer system as recited in claim 1, wherein the camera comprises a depth camera and the first device comprises a head mounted augmented reality display.

3. The computer system as recited in claim 2, wherein the stored executable instructions are further operable, when executed by the one or more processors, to cause the computer system to save the compressed video data to a file.

4. The computer system of claim 2, wherein the stored executable instructions are further operable, when executed by the one or more processors, to cause the computer system to communicate the compressed video data and the one or more second frame image(s) to a second device.

5. The computer system of claim 4, stored executable instructions are further operable, when executed by the one or more processors, to cause the computer system to:
    cause the second device to construct a 3D representation of the shape of a user's environment based on the pose data and to generate re-projected frame image data and to apply the received compressed video data to the re-projected one or more first frame image(s) to further generate new frame image data.

6. The computer system of claim 5, wherein the stored executable instructions are further operable, when executed by the one or more processors, to cause the computer system to save the new frame image data to a file.

7. The computer system of claim 5, wherein the new image data is rendered on a display associated with the second device.

8. The computer system of claim 5, wherein the stored executable instructions are further operable, when executed by the one or more processors, to cause the computer system to transmit detected changes in surface (depth) information to the second device.

9. The computer system of claim 8, wherein the stored executable instructions are further operable, when executed by the one or more processors, to cause the computer system to accumulate, for a plurality of image frames, a textured model of a 3D environment associated with the video to refine textures applied to surfaces of the 3D environment as a user encounters the 3D environment from different camera positions over time.

10. A video compression method comprising:
    capturing successive frames of video from a camera incorporated into a first device, the successive frames of video comprising one or more first frame image(s) and one or more second frame image(s) and including surface (depth) information;
    detecting a change in a location and orientation (pose) of the camera between a first location and orientation (pose) of the one or more first frame image(s) and a second location and orientation (pose) of the one or more second frame image(s);
    generating re-projected one or more first frame image(s) as viewed from the second location and orientation (pose);
    passing the re-projected one or more first frame image(s) to a video compressor for computing differences between the re-projected one or more first frame image(s) and the one or more second frame image(s); and
    generating compressed video data comprising only the differences between the re-projected one or more first frame image(s) and the one or more second frame image(s).

11. The method of claim 10, the method further comprising:
    saving the compressed video data to a file.

12. The method of claim 10, the method further comprising:
    communicating the compressed video data and camera pose data to a second device.

13. The method of claim 12, the method further comprising:
   causing the second device to construct a 3D representation of the shape of a user's environment based on the pose data and to generate re-projected frame image data.

14. The method of claim 13, the method further comprising:
   causing the second device to apply the received compressed video data to the re-projected one or more first frame image(s) to further generate new frame image data.

15. The method of claim 14, the method further comprising saving the new frame image data to a file.

16. The method of claim 14, wherein the new image data is rendered on a display associated with the second device.

17. The method of claim 10, the method further comprising:
   detecting new surfaces or features in a 3D representation of a user's environment that become visible from the location and orientation (pose) of the camera for the one or more second frame image(s) and generating 3D representation change data representative of differences between the 3D representation of the user's environment associated with the one or more first frame image(s) and the 3D representation of the user's environment associated with the one or more second frame image(s).

18. The method of claim 17, the method further comprising:
   communicating the compressed video data, camera pose data and the 3D representation change data to a second device.

19. The method of claim 17, the method further comprising:
   performing a screenspace transformation operation, wherein each pixel of the image has color (from the camera) and depth (from the z-buffer), to reproject the one or more first frame image(s) as viewed from the second location and orientation (pose) of the camera based on a corresponding 3D position of each pixel.

20. One or more computer-readable media hardware storage device(s) having stored executable instructions that are executable by one or more processors of a computer system to cause the computer system to perform at least the following:
   capture successive frames of video from a camera incorporated into a first device, the successive frames of video comprising one or more first frame image(s) and one or more second frame image(s) and including surface (depth) information;
   detect a change in a location and orientation (pose) of the camera between a first location and orientation (pose) of the one or more first frame image(s) and a second location and orientation (pose) of the one or more second frame image(s);
   generate re-projected one or more first frame image(s) as viewed from the second location and orientation (pose);
   pass the re-projected one or more first frame image(s) to a video compressor for computing differences between the re-projected one or more first frame image(s) and the one or more second frame image(s); and
   generate compressed video data comprising only the differences between the re-projected one or more first frame image(s) and the one or more second frame image(s).

* * * * *